United States Patent [19]
Teshome

[11] Patent Number: 5,974,497
[45] Date of Patent: Oct. 26, 1999

[54] COMPUTER WITH CACHE-LINE BUFFERS FOR STORING PREFETCHED DATA FOR A MISALIGNED MEMORY ACCESS

[75] Inventor: Abeye Teshome, Austin, Tex.

[73] Assignee: Dell Computer Corporation, Round Rock, Tex.

[21] Appl. No.: 08/861,778

[22] Filed: May 22, 1997

[51] Int. Cl.$^6$ .................................................... G06F 13/00
[52] U.S. Cl. ...................... 710/129; 710/107; 710/113; 710/116; 710/119; 710/128; 710/22; 710/123; 710/114; 710/121
[58] Field of Search ................................. 711/137, 143, 711/142; 395/584, 383, 800.23, 855, 872, 876; 710/129, 128, 109, 107, 113, 22, 114–125; 370/402

[56] References Cited

U.S. PATENT DOCUMENTS

| | | | |
|---|---|---|---|
| 4,371,924 | 2/1983 | Schaefer et al. | 364/200 |
| 4,755,933 | 7/1988 | Teshima et al. | 364/200 |
| 4,881,163 | 11/1989 | Thomas et al. | 364/200 |
| 5,319,769 | 6/1994 | Muramatsu | 395/425 |
| 5,367,660 | 11/1994 | Gat et al. | 395/425 |
| 5,418,927 | 5/1995 | Chang et al. | 345/425 |
| 5,461,718 | 10/1995 | Tatosian | 395/416 |
| 5,526,510 | 6/1996 | Akkary et al. | 395/460 |
| 5,535,345 | 7/1996 | Fisch et al. | 395/309 |
| 5,544,346 | 8/1996 | Amini et al. | 395/481 |
| 5,577,200 | 11/1996 | Abramson et al. | 395/183.03 |
| 5,664,117 | 9/1997 | Shah et al. | 395/280 |
| 5,680,572 | 10/1997 | Akkary et al. | 395/453 |
| 5,781,789 | 7/1998 | Narayan | 395/800.23 |

OTHER PUBLICATIONS

The PCI System Arechitecture, pp. 71, 91–92, 474–477, Dec. 1995.

*Primary Examiner*—Eddie P. Chan
*Assistant Examiner*—Kimberly McLean
*Attorney, Agent, or Firm*—Haynes and Boone, L.L.P.

[57] ABSTRACT

In a computer including two buses, a main memory, a write back cache, and a peripheral device, a method and apparatus for providing an inter-bus buffer to support successive main memory accesses from the peripheral device is disclosed. The buffer is included in a bridge device for interfacing the two computer buses and controlling when the peripheral device may access the main memory. When the peripheral device attempts to read data from the main memory that is duplicated in the cache and that has become stale, the bridge device initiates a write back operation to update specific data portions of the main memory corresponding to the read request. The bridge device uses look-ahead techniques such as bursting or pipelining to streamline the data coming from the cache to the main memory and to the peripheral device. When the peripheral device requests a misaligned memory read operation, upon termination of the read access due to preemption of the peripheral device, the cache line containing the remainder of the requested data is written back to the main memory, and stored in the buffer. The bridge device can then use the data stored in the buffer to respond to subsequent memory access requests from the peripheral device.

24 Claims, 4 Drawing Sheets

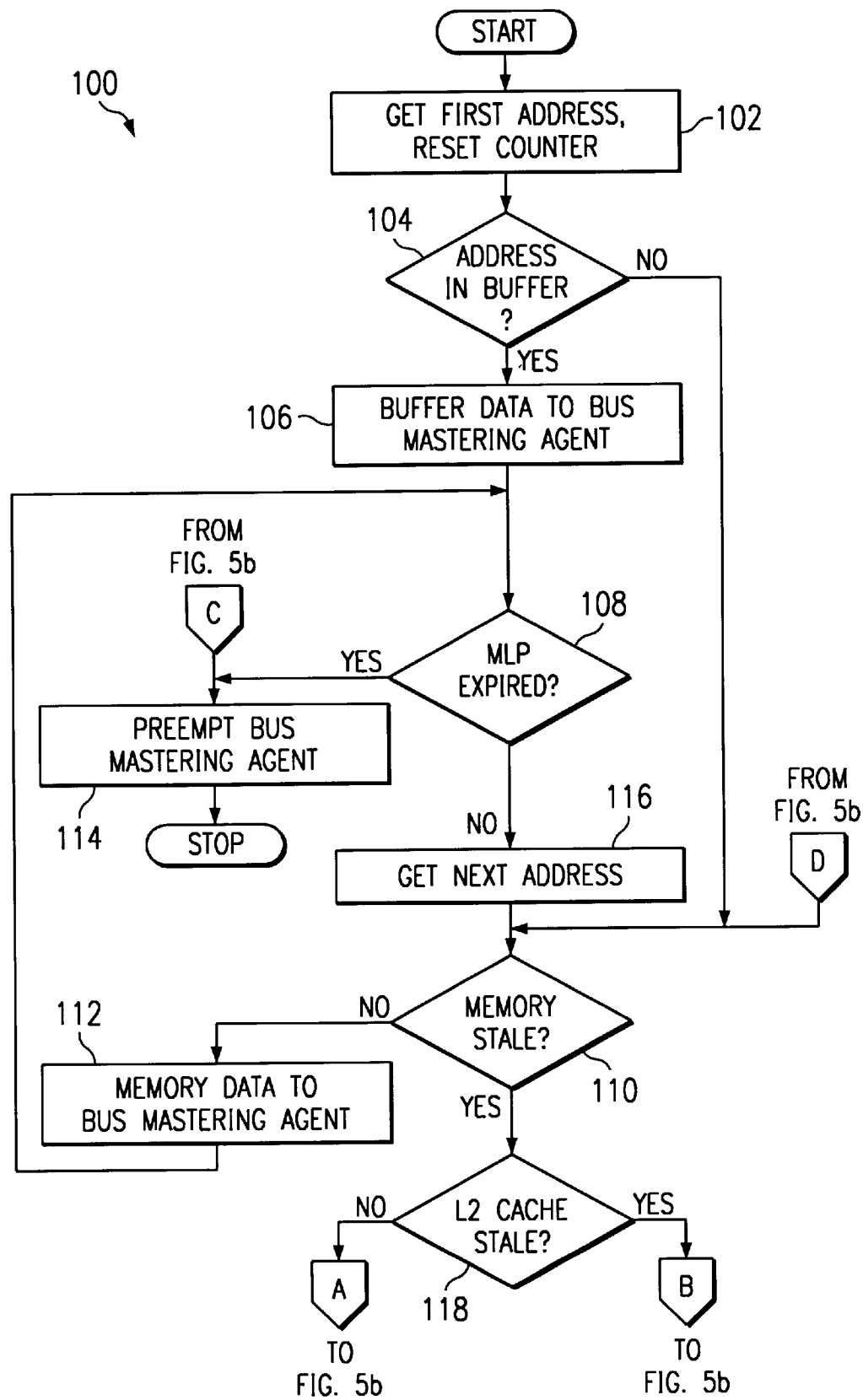

COMPUTER WITH CACHE-LINE BUFFERS FOR STORING PREFETCHED DATA FOR A MISALIGNED MEMORY ACCESS

TECHNICAL FIELD

The invention relates generally to the field of computers and, more particularly, to a method and apparatus for aligning data flowing between two or more buses in a computer to increase memory read access bandwidth.

BACKGROUND

Computers are continually progressing in several key areas, including speed of operation and peripheral device support. However, progression in some areas can often impede progression in other areas. For example, to many conventional computers utilize a cache memory system for storing one or more duplicate memory portions of a computer's main memory. The cache thereby allows a device such as a central processing unit ("CPU") to make multiple, quick accesses to a localized area of the main memory. Typically, a cache has relatively fast access times for read and write operations being performed by the CPU, as compared to the main memory, but the cache is more expensive than the main memory. Therefore, a balance must be struck between the size of the cache relative to the main memory of the computer.

The cache is typically organized in cache lines, which are groupings of data words. For example, a cache line may consist of sixteen data words. Also, read and write operations to the cache are focused on one entire cache line at a time. Read operations are fairly straightforward, but write operations can present several difficulties. One difficulty revolves around what to do with stale main memory. A stale main memory occurs when a write operation has been performed on the cache so that the cache no longer duplicates, or is no longer coherent with, the corresponding portion of main memory. To resolve this difficulty, several types of caches have been commonly implemented, two types being "write back" and "write through". Each of the two cache types has benefits and drawbacks well known by those of ordinary skill in the art.

In addition to the CPU, the cache, and the main memory, a computer supports a variety of peripheral devices. The peripheral devices are typically connected to each other through a peripheral bus and interface the CPU, cache and main memory through a bridge device. Due to the operation of the peripheral devices, implementation of the write back cache presents additional difficulties. This is because the peripheral devices request read operations to portions of the computer's main memory which are frequently stale. As a result, when a peripheral device has control of the peripheral bus and begins to perform a memory read operation, i.e., the peripheral device becomes a bus mastering agent, a determination must first be made as to whether the requested portion of the main memory needs to be updated by the cache. Therefore, a snoop operation is typically employed to determine the state of the requested portion of main memory in the cache.

Since both the CPU and the peripheral devices are accessing the computer's main memory and the cache, the slave device should support quick operation of the CPU as well as adequate support of the peripheral devices. To provide such support, the slave device often utilizes one or more memory management techniques. For example, the slave device may utilize look-ahead, or "speculative", techniques for increasing the bandwidth, or rate of data transfer, from memory to the CPU or the bus mastering agent. It is understood that a variety of speculative techniques are well known in the art.

Despite the improvements provided by the use of such speculative techniques, there are certain instances when a single bus mastering agent attempts to monopolize the bus. One such instance is when the bus mastering agent requests a misaligned memory read operation. A misaligned memory read operation is a memory access to a location that does not begin at the beginning of a cache line. In the example above where one cache line is sixteen data words long, a misaligned memory read operation may attempt to read data beginning with the fourth data word of the cache line.

To prevent a bus mastering agent from monopolizing the bus, the slave may utilize a monitored latency period. A monitored latency period is a limit on how long a single bus mastering agent can own or control the bus. Once that limit has been reached, the bus mastering agent is preempted, thereby terminating its ownership of the bus. While this technique prevents monopolization of the bus by a single bus mastering agent, it sometimes has an overall effect of slowing down the computer because the bus mastering agent must again arbitrate for ownership of the bus to finish its request. Furthermore, when speculative read techniques are employed, in conjunction with the monitored latency period, the benefits of the speculative read are somewhat diminished in situations where the data is cached but the bus mastering agent is preempted.

SUMMARY

In carrying out principles of the present invention, one embodiment thereof provides an aligning buffer for supporting memory read operations where speculative techniques are employed in a computer. The aligning buffer may reside between a local bus and a peripheral bus of the computer. The peripheral bus, which may be a peripheral component interconnect ("PCI") bus, connects one or more bus-mastering peripheral devices and sends addresses and data back and forth between the peripheral devices.

The aligning buffer is part of a bridge device connected between and selectively allocating control of the two buses. The bridge device allows addresses and data to flow back and forth between the two buses, and also controls when certain peripheral devices connected to the peripheral bus may access the main memory. When a peripheral device requests a read operation from a stale portion of the main memory, the bridge device causes the cache to write back specific portions of data to the main memory so that the peripheral device can receive updated data. Furthermore, the bridge device utilizes an access-dependent latency period for restricting the amount of time in which the peripheral device may have ownership of the bus. The specific portions of data coming from the cache are written back to memory as a cache line.

While the specific portions of data from the cache are being written to the main memory, the bridge device also provides the data to the requesting peripheral device. The method and apparatus described herein are particularly advantageous in instances when the peripheral device initiates a memory access with a misaligned address. In such instances, several cache lines of data are written back to the main memory while simultaneously being supplied to the peripheral device. However, by the time the last cache line of data is being written back to the main memory, the peripheral device has either terminated the cycle because its own buffers are full, or has been preempted due to latency constraints. The data from the last cache line is, however, stored in the aligning buffer. Therefore, when the peripheral device requests another memory access to complete the preempted read operation, the aligning buffer can quickly supply the data to the peripheral device and pass the next address for prefetch operation to other blocks in the bridge device.

A technical advantage is that the overall bandwidth and speed of operation of the computer is increased.

Another technical advantage is that the peripheral device does not have to access main memory to complete a terminated read operation.

Another technical advantage is that after a first misaligned memory access that would have caused a preemption of the peripheral device without the aligning buffer, a subsequent memory access by the peripheral device will likely be an aligned memory access.

BRIEF DESCRIPTION OF THE DRAWINGS

FIGS. 5a and 5b are a flowchart representing an operation of the embodiment of FIG. 1.

DETAILED DESCRIPTION OF THE PREFERRED EMBODIMENT

Figure 1:
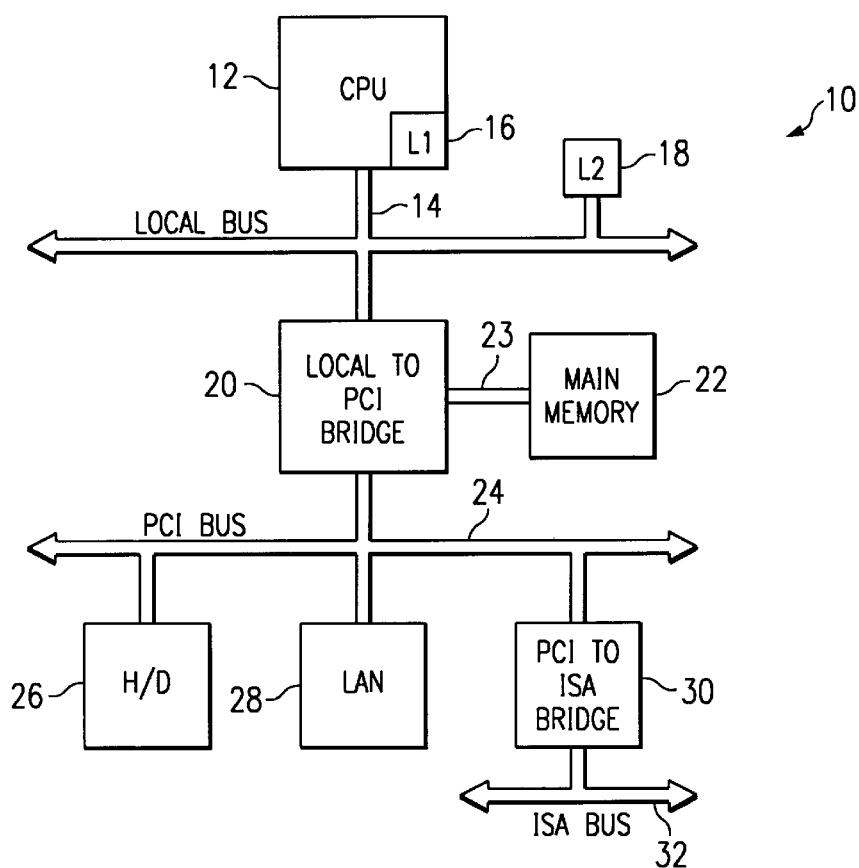
FIG. 1 is a diagram of a computer including two cache memories, a main memory, a plurality of peripheral devices, and a bridge embodying features of one embodiment of the present invention.

Referring to FIG. 1, reference numeral 10 generally designates a computer embodying features of one embodiment of the present invention. The computer 10 includes a CPU 12 connected to a local bus 14. The CPU 12 has an internal, first level cache ("L1 cache") 16, but also utilizes an external, second level cache ("L2 cache") 18 connected to the local bus 14. Both caches 16, 18 are write back type caches. Other devices are also connected to the local bus 14, including a bridge 20. The bridge 20 performs several functions such as controlling access to a main memory 22 of dynamic random access memories ("DRAMs") through a memory bus 23.

The bridge 20 also interfaces the local bus 14 with a peripheral bus 24. In the preferred embodiment, the peripheral bus 24 is a peripheral component interconnect ("PCI") bus, as defined by Intel Corp. of Santa Clara, Calif. The PCI bus 24 supports many different peripheral devices, including, for example, a hard drive ("H/D") 26, a local area network interface ("LAN") 28, and a secondary bridge 30 for further supporting additional buses such as an industry standard architecture ("ISA") bus 32.

Figure 2:
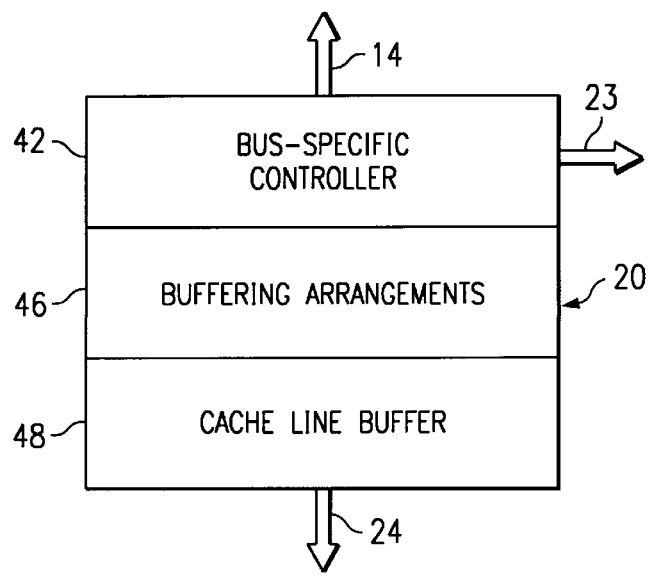
FIG. 2 is a block diagram of the bridge of FIG. 1.

Referring to FIG. 2, the bridge 20 contains several subcomponents interconnected by one or more of the three buses 14, 23, 24 or by other buses not shown. As mentioned above, the bridge 20 includes a bus-specific controller 42 for controlling access to the main memory 22. The controller 42 also controls other functions including the transfer of data between the buses 14, 23, 24. It is understood that the controller 42 may represent one or more different devices, the basic functions thereof being well understood by those of ordinary skill in the art.

In the preferred embodiment, a single cache line consists of sixteen data words, but to simplify the following description, a cache line of two data words will be used hereafter. Furthermore, corresponding buffer sizes and groups of data words in the following description are also reduced for ease of description, it being understood that different sizes of cache lines and buffers are easily extrapolated by those of ordinary skill in the art. The bridge 20 also includes buffering arrangements 46 used for temporary storage and an aligning cache line buffer 48.

Assume for example that the LAN 28 has become the bus mastering agent and is requesting to fill an internal four data word buffer with four data words from the main memory 22, such data words also residing in the L2 cache 18. A cache controller (not shown) first determines whether the data words in the accessed portion of the main memory 22 are stale. In the present example, the data words are stale, so the cache controller then initiates a write back operation from the L2 cache 18. Simultaneous with supplying the LAN 28 with the requested data words, the bridge 20 utilizes the buffering arrangements 46 and the memory controller to update the main memory 22.

In actuality, the L2 cache 18 operates by supplying one cache line at a time during the write back operation. Therefore, if the LAN 28 is requesting a read operation that is aligned to a cache line of the L2 cache 18, i.e., an aligned memory access, the read operation will typically be completed before the LAN 28 is preempted. However, there are instances when the LAN 28 will be preempted before completing the operation. For example, if the LAN 28 is requesting a read operation that is not aligned, i.e., a misaligned memory access, the read operation will typically not be completed before the LAN is preempted. In these instances, the LAN 28 must make another read request before its internal buffer is filled, as described in greater detail below.

Figure 3:
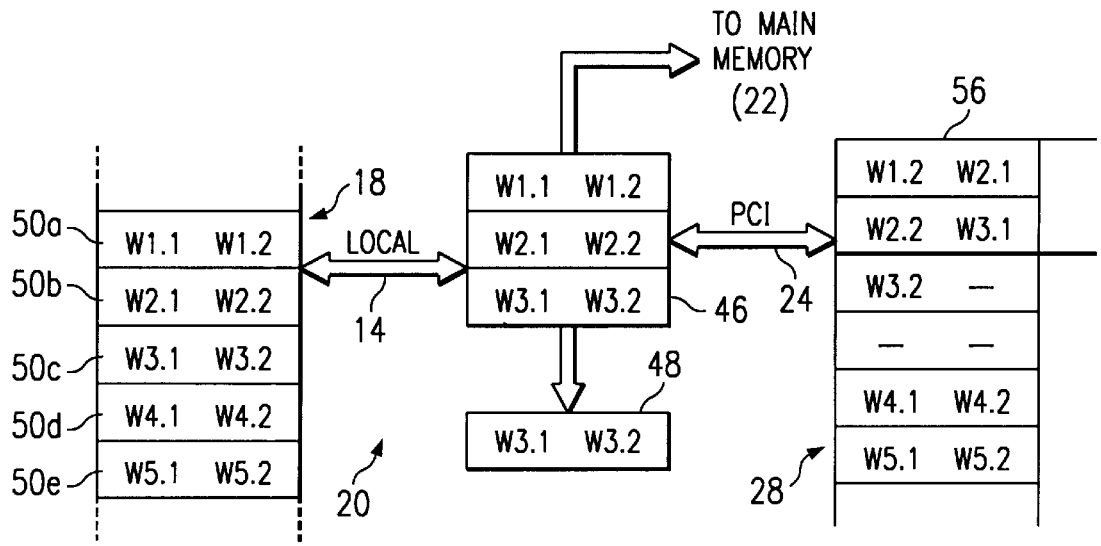
FIG. 3 is a diagram of three cache lines from one of the caches, a portion of the bridge, and an internal buffer from one of the peripheral devices, all of FIG. 1.

Referring to FIG. 3, three cache lines of the L2 cache 18 are designated by the reference numerals 50a, 50b, and 50c. The first cache line 50a includes consecutive data words W1.1, W1.2, the second cache line 50b includes consecutive data words W2.1, W2.2, and the third cache line 5Oc includes consecutive data words W3.1, W3.2. The LAN 28 includes a four-data-word buffer 56 that is to be filled with data read from main memory 22 that also resides in the L2 cache 18. In this example, the LAN 28 requests a misaligned memory access, starting with the data word W1.2 of the first cache line 50a and ending with the data word W3.1 of the third cache line 50c. As stated above, all the data being requested by the LAN 28 is stale.

When the misaligned memory access is received by the bridge 20, the bridge first performs a write back operation on the entire first cache line 50a from the L2 cache 18 into the main memory 22, even though the first data word W1.1 is not needed. The bridge 20 also supplies the second data word W1.2 to the LAN 28, which it copies into its buffer 56. Afterwards, the bridge 20 performs a write back operation on the second cache line 50b from the L2 cache 18 into the main memory 22. Similarly, the LAN 28 copies both data words W2.1, W2.2 into its buffer 56. Since the LAN 28 requires one more data word W3.1 to fill its buffer 28, on the next write back cycle the bridge 20 performs for the third cache line 50c, the LAN 28 reads the data word W3.1 and terminates the memory access, effectively ending the LAN's ownership of the PCI bus 24. The write back cycle for the third cache line 50c completes regardless of the memory access ending on the PCI bus 24. The speculative reads will cause write back cycles on consecutive cache lines 50d and 50c. Latency, however, is not based on the number of transfers, but the number of consumed clock cycles by the master. As a result, the data word W3.2 will not be supplied due to latency issues and the LAN 28 is preeempted.

The cache line buffer 48 stores the last cache line 50c read from the L2 cache, which in this example includes the data words W3.1, W3.2. This is done in anticipation that the LAN 28 will re-arbitrate to become a bus mastering agent to continue, reading from the contiguous address from the last memory access. When the LAN 28 successfully becomes a bus mastering agent again, it will request a mis-aligned memory access, stating with the data word W3.2 of the third cache line 50c. Because a copy of the third cache line 50c resides in the cache line buffer 48, the data can quickly be returned to the LAN 28 before it is preempted. AU subsequent memory access by the LAN 28 will be aligned accesses, e.g., the next memory access by LAN 28 will be to the fourth cache line 50d starting with data word W4.1.

Figure 4:
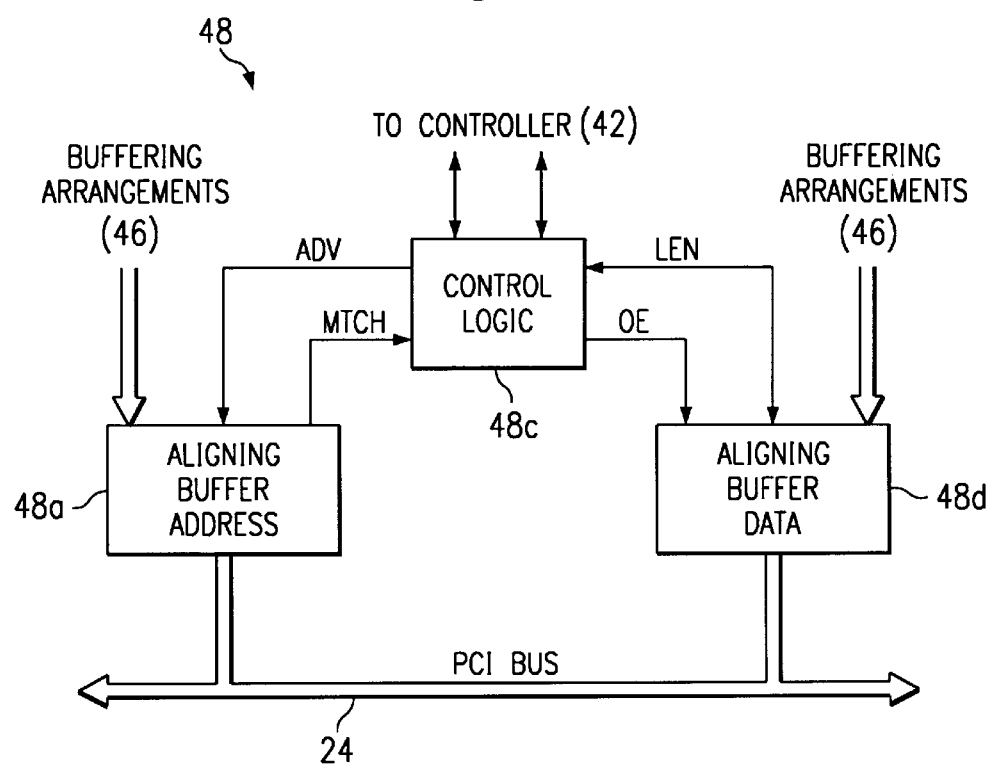
FIG. 4 is a diagram of the cache line buffer of the bridge of FIG. 1.

Referring to FIG. 4, one implementation of the cache line buffer 48 includes an aligning address buffer 48a, a one cache line (two data word) aligning data buffer 48d, buffer logic 48c, and various control signals, including a latch enable signal LEN, an output enable signal OE, an advance signal ADV, and a match signal MTCH. The buffer logic 48c interfaces with the bus specific controller 42. The address buffer 48a and the data buffer 48d interface with the buffering arrangements 46 aid the PCI bus 24. During a cache write back operation, such as the one described above with reference to FIG. 3, the controller 42 informs the buffer logic 48c when the third and final cache line 50c is being written to the main memory 22. At this time, the buffer logic 48c activates the advance signal ADV to store the address of the cache line 50c in the address buffer 48a. Simultaneously, the buffer logic 48c also activates the latch enable signal LEN to store the two data words W3.1, W3.2 of the cache line in the data buffer 48d. As a result, the cache line 50c is both written to the main memory 22 and stored in the cache line buffer 48.

Still using the example above, when the LAN 28 becomes the bus mastering agent again and begins its next memory access starting with data word W3.1, it drives a corresponding address on the PCI bus 24. The corresponding address is compared to the address stored in the address buffer 48a. Since the two address are the same, the address buffer 48a asserts the match signal MTCH to inform the buffer logic 48c that the data buffer 48d already has the data being requested by the LAN 28. The buffer logic 48c informs the controller 42 to prevent it from performing additional work on the memory access. Then, the buffer logic 48c asserts the byte enable signal OE to allow the data buffer 48d to drive the data, which includes data words W3.1 and W3.2. The LAN 28 may then proceed to its next memory access request.

Figure 5B:
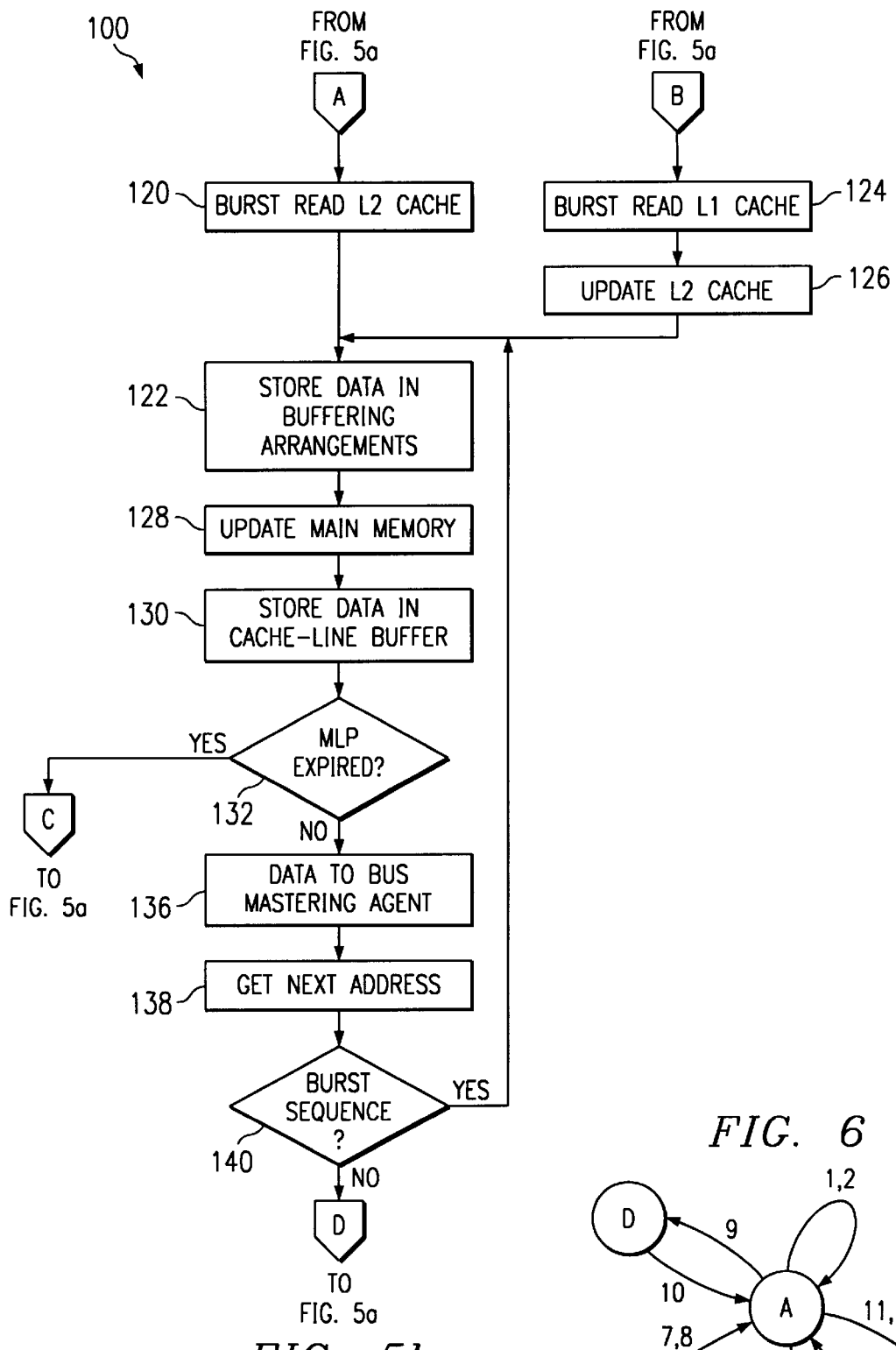

Referring to FIGS. 5a and 5b, reference numeral 100 designates a flow sequence illustrating operational steps used by the bridge 20 when supporting accesses to the main memory 22 by one or more of the peripheral devices 26, 28, 30. Execution begins at step 102, where the peripheral devices that has become a bus mastering agent provides an initial address location for a read operation on the main memory 22. Also, a counter (not shown) inside the controller 42 is initiated, the counter being used to check a monitored latency period ("MLP") discussed in greater detail below. Execution then proceeds to step 104, where a determination is made as to whether the requested address location references data that is stored inside the cache line buffer 48. If the data is stored inside the cache line buffer 48, execution proceeds to step 106 where the data stored in the cache line buffer is supplied to the bus mastering agent. Execution then proceeds to step 108, where a determination is made as to whether the bus mastering agent has been preempted, as discussed in greater detail below.

If at step 104 it is determined that the data corresponding to the requested address location is not stored inside the cache line buffer 48, execution proceeds to step 110. At step 110, a determination is made as to whether the data stored in the main memory 22 at the requested address is stale. If the data is not stale, execution proceeds to step 112, where the data stored in the main memory 22 at the requested address is supplied to the bus mastering agent. Execution then returns to step 108, where the counter is checked to determine if the MLP has expired. If the MLP has expired, execution proceeds to step 114 where the bus mastering agent is preempted and the flow sequence ends. If the MLP has not expired, execution proceeds to step 116, where the next requested address is retrieved from the bus mastering agent. Execution then proceeds to step 110.

If at step 110 it is determined that the data stored in the main memory 22 at the requested address is stale, execution proceeds to step 118 where a determination is made as to whether the data stored in the L2 cache 18 that corresponds to the requested address is stale. If the data is not stale, execution proceeds to step 120, wherein a burst read operation is initiated on the L2 cache 18 beginning with the first cache line that includes the data from the requested address. Execution then proceeds to step 122, discussed in greater detail below.

If at step 118 it is determined that the data stored in the L2 cache 18 is stale, execution proceeds to step 124 where a burst read operation is initiated on the L1 cache 16 beginning with the first cache line that includes the data from the requested address. Execution then proceeds to step 126, where the data retrieved from the L1 cache 16 is written back to the L2 cache 18. Execution then proceeds to step 122.

At step 122, one cache line of the data retrieved from either the L1 cache 16 or the L2 cache 18 is stored inside the buffering arrangements 46. At step 128, the data stored inside the buffering arrangements 46 is written back to the main memory 22. At step 130, which occurs simultaneously with step 124, the data stored inside the buffering arrangements 46, along with the requested address, are stored in the cache line buffer 48. At step 132, the counter is checked to determine if the MLP has expired. If the MLP has expired, execution proceeds to step 114 where the bus mastering agent is preempted and the flow sequence ends.

If at step 132 the MLP has not expired, execution proceeds to step 136 where data stored inside the buffering arrangements 46 is supplied to the bus mastering agent. At step 138, the next requested address is retrieved from the bus mastering agent. At step 140, a determination is made as to whether the retrieved address follows the predetermined burst sequence. If so, execution returns to step 122. If the retrieved address does not follow the predetermined burst sequence, execution returns to step 110.

As a result, a substantial savings in bus bandwidth for both the local bus 14 and the PCI bus 24 is generated by the preferred embodiment described herein due to the time savings provided by the cache line buffer 48. Furthermore, the preferred embodiment also realigns the LAN 28 after its first misaligned memory access by only retrieving and storing complete cache lines of data. Therefore, the next memory access from the LAN 28 will likely be an aligned memory access and will not be preempted before completion.

Figure 6:
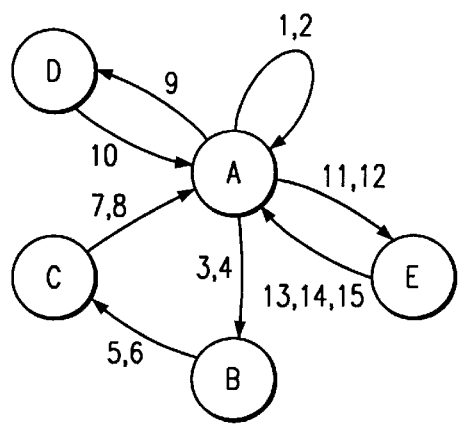
FIG. 6 is a state diagram representing an operation of the cache line buffer of FIG. 4.

Referring to FIG. 6, reference numeral 200 designates a state diagram illustrating operational steps and functional states for the cache line buffer 48 of FIG. 4. To best describe the state diagram 200, Table 1 below describes all the potential state transitions from a present state ("PS") to a next state ("NS") and the conditions required for each transition.

TABLE 1

| PS | NS | Condition |
|----|----|-----------|
| A | A | 1. The cache line buffer 48 is in an idle state OR |
|   |   | 2. For all input/output bus cycles. |
| A | B | 3. A read cycle on the PCI bus 24 is initiated to an address in the address buffer 48a AND |
|   |   | 4. A snoop to the caches 16, 18 did not require a write back operation. |
| B | C | 5. Inform the controller 42 to prevent additional work AND |
|   |   | 6. Pass a prefetch address for the next memory access. |
| C | A | 7. Data is supplied to the PCI bus 24 AND |
|   |   | 8. Byte enables are asserted on the PCI bus to allow the bus master to access the data. |
| A | D | 9. A write cycle on the PCI bus 24 is initiated to an address in the address buffer 48a. |
| D | A | 10. The address in the address buffer 48a is invalidated. |
| A | E | 11. A read cycle on the PCI bus 24 is initiated to an address that is not in the address buffer 48a OR |
|   |   | 12. A snoop to the caches 16, 18 does require a writeback operation. |
| E | A | 13. A new address is stored in the address buffer 48a AND |
|   |   | 14. New data is stored in the data buffer 48d AND |
|   |   | 15. Byte enable information is stored |

It is understood that the invention described herein can take many forms and embodiments, the embodiments described herein are intended to illustrate rather than limit the invention. Further, the bus configurations, bus sizes, cache line sizes, peripheral devices, and other details of the above description are only meant to illustrate the invention. Further still, the techniques described herein may be utilized in a computer such as a desktop, laptop or tower computer, as well as in a variety of other electronic data circuits. Therefore, variations may be made without departing from the spirit of the invention. Accordingly, it is appropriate that the appended claims be construed broadly and in a manner consistent with the scope of the invention.

What is claimed is:

1. A computer comprising:

a processor;

a first memory connected to the processor;

a second memory connected to the processor;

a peripheral device;

a peripheral bus connected to the peripheral device; and a bridge connected to the peripheral bus for interfacing the first memory, the second memory and the peripheral device, wherein the bridge comprises:

first control logic for allowing the peripheral device to control the peripheral bus;

second control logic for enabling the peripheral device to access data from a selected location of the second memory in response to a misaligned memory read operation, for updating data stored at the selected location of the second memory with data retrieved from a selected location of the first memory, and for retrieving an additional data from another location of the first memory wherein the data retrieved from the selected location of the first memory is misaligned with the additional data retrieved from the first memory;

third control logic for preempting the peripheral device from further control of the peripheral bus, thereby preventing the peripheral device from retrieving the additional data; and a cache line buffer for storing the retrieved additional data and for supplying the retrieved additional data to said peripheral device responsive to a subsequent memory access request.

2. The computer of claim 1 wherein the bridge further comprises look-ahead logic for anticipating the subsequent memory access request.

3. The computer of claim 1 wherein the cache line buffer is connected directly to the peripheral bus.

4. The computer of claim 1 wherein the bridge further comprises a plurality of buffering arrangements.

5. The computer of claim 1 wherein the peripheral bus is a PCI bus.

6. The computer of claim 1 wherein the control logic utilizes a write back caching method for updating data stored at the selected location of the second memory.

7. The computer of claim 1 wherein the first and subsequent memory access requests are memory read operations.

8. The computer of claim 1 wherein the first memory is a cache internal to the processor and the cache line buffer can store one line of the cache.

9. A method for supporting read requests from a peripheral device on a peripheral bus to a main memory, the method comprising the steps of:

receiving a misaligned read request from the peripheral device for a first selected data portion of the main memory;

allowing the peripheral device to control the peripheral bus;

retrieving first and second data portions of a first memory to update the first selected data portion of the main memory, wherein the first memory has a plurality of lines of data and the first selected data portion is misaligned with the second data portion;

updating the main memory with the first data portion retrieved from the first memory;

providing the first data portion retrieved from the first memory to the peripheral device;

storing the second data portion retrieved from the first memory in a buffer;

preempting the peripheral device from continued control of the peripheral bus, thus preventing the peripheral device from retrieving the second data portion;

receiving a second read request from the peripheral device for a second selected data portion of the main memory; and in response to receiving the second read request, providing the second data portion being stored in the buffer to the peripheral device.

10. The method of claim 9 wherein the step of updating the main memory comprises writing back the first data portion retrieved from the first memory to the main memory.

11. The method of claim 9 wherein the first memory is a cache of the main memory.

12. The method of claim 9 wherein the second data portion comprises a complete line of data.

13. An apparatus for interfacing a first memory, a peripheral device, and a second memory, and for supporting read requests from the peripheral device to the second memory through a peripheral bus, the apparatus comprising:

means for receiving first and second read requests from the peripheral device, the first and second read requests corresponding to a first and second data portion of the second memory, respectively;

means for allowing the peripheral device to control the peripheral bus;

means for retrieving two data portions stored in the first memory in response to receipt of the first read request from the peripheral device;

means for updating the second memory with the first data portion retrieved from the first memory;

means for providing the first data portion retrieved from the first memory to the peripheral device;

means for storing the second data portion retrieved from the first memory in a buffer in response to the peripheral device being preempted from the peripheral bus;

means for providing the second data portion being stored in the buffer to the peripheral device in response to receiving the second read request from the peripheral device and the peripheral device regaining control of the peripheral bus.

14. The apparatus of claim 13 wherein the means for updating the second memory utilizes a write back technique to copy the first data portion retrieved from the first memory to the second memory.

15. The apparatus of claim 13 wherein the first memory is a cache of the second memory.

16. The apparatus of claim 15 wherein the first memory comprises a plurality of cache lines each having first and second data words, and wherein the first read request skips the first data word and starts with the second data word of a cache line.

17. The apparatus of claim 16 wherein the second data portion includes both data words of one cache line.

18. The apparatus of claim 15 wherein the means for updating the second memory with the first data portion retrieved from the first memory also updates the second memory with the second data portion retrieved from the first memory.

19. The apparatus of claim 13 wherein the means for storing includes a cache address buffer, a cache data buffer, and buffer logic.

20. The apparatus of claim 19 wherein the cache address buffer and the cache data buffer are connected to the peripheral device via the peripheral bus, and the buffer logic is connected to the means for receiving read requests and the buffer logic controls the operation of the cache data buffer.

21. The apparatus of claim 13 wherein the means for retrieving the first and second data portions of data from the first memory utilizes a look-ahead memory access technique selected from the group of bursting or pipelining.

22. The apparatus of claim 20 wherein upon retrieving the second data portion of data from the first memory, the buffer logic stores an address value associated with the second data portion of data inside the cache address buffer.

23. The apparatus of claim 22 wherein the cache address buffer includes compare logic so that upon receipt of the second read request from the peripheral device, the compare logic can compare the address stored in the cache address buffer with the address associated with the second read request and inform the buffer logic if the two addresses match.

24. The apparatus of claim 23 wherein the control logic device includes means to inform the cache data buffer to output the data stored therein to the peripheral device in response to being informed that the two addresses match.

* * * * *